US007848974B1

(12) United States Patent
Sheehan

(10) Patent No.: US 7,848,974 B1
(45) Date of Patent: Dec. 7, 2010

(54) ELECTRONIC ACQUISITION OF BILL PAYMENT INFORMATION FROM A FINANCIAL ACCOUNT

(75) Inventor: Mark Sheehan, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1245 days.

(21) Appl. No.: 10/930,835

(22) Filed: Sep. 1, 2004

(51) Int. Cl.
*G06Q 40/00* (2006.01)
(52) U.S. Cl. ........................................................ 705/35
(58) Field of Classification Search .................... 705/35, 705/36, 37, 38, 39
See application file for complete search history.

(56) References Cited

U.S. PATENT DOCUMENTS

| | | | | |
|---|---|---|---|---|
| 5,842,211 | A * | 11/1998 | Horadan et al. | 707/10 |
| 5,884,312 | A * | 3/1999 | Dustan et al. | 707/10 |
| 5,913,202 | A * | 6/1999 | Motoyama | 705/36 R |
| 7,370,011 | B2 * | 5/2008 | Bennett et al. | 705/39 |
| 7,395,241 | B1 * | 7/2008 | Cook et al. | 705/39 |
| 7,406,445 | B1 * | 7/2008 | Silverbrook et al. | 705/42 |
| 2001/0032183 | A1 * | 10/2001 | Landry | 705/40 |
| 2003/0204460 | A1 * | 10/2003 | Robinson et al. | 705/35 |
| 2003/0225688 | A1 * | 12/2003 | Dobbins | 705/39 |
| 2004/0122766 | A1 * | 6/2004 | Brooks et al. | 705/40 |
| 2004/0162773 | A1 * | 8/2004 | Del Rey et al. | 705/36 |
| 2004/0254991 | A1 * | 12/2004 | Malik et al. | 709/206 |
| 2006/0116949 | A1 * | 6/2006 | Wehunt et al. | 705/35 |

OTHER PUBLICATIONS

CNBC on MSN Money, 2003, (Aug. 2002, 29 pages published no later than Mar. 2004)j.*
Service Puts Customers Accounts on Favorite Sites—American Banker 164 167 11, Aug. 31, 1999, ISSN 002-7561.*
Banking Online Gains Momentum Roanoke Times & World News, Roanoke, VA p. 1 Kelly Sandra Brown Aug. 9, 1998.*
Switch Banks FAQ Personal National City Corporation 2003 (5 pages, attached).*

* cited by examiner

*Primary Examiner*—Alexander Kalinowski
*Assistant Examiner*—Bruce I Ebersman
(74) *Attorney, Agent, or Firm*—Hunton & Williams LLP

(57) ABSTRACT

A system and method for computer-implemented method for setting up customer bill payment information associated with a first financial account maintained by a first financial institution in a second account maintained by a second financial institution is provided. A request to transfer bill payment information from a first account with a first financial institution into a second account with a second financial institution is received from a customer, wherein the first account comprises first customer bill payment information, and wherein the transfer request comprises account access information usable to access the first account. The customer bill payment information is acquired by the second financial institution using a computer. The customer bill payment information is set up in the second account.

24 Claims, 2 Drawing Sheets

ELECTRONIC ACQUISITION OF BILL PAYMENT INFORMATION FROM A FINANCIAL ACCOUNT

FIELD OF THE INVENTION

The present invention relates to a system and method for obtaining financial information such as bill payment information by one financial institution from an account maintained by another financial institution.

BACKGROUND OF THE INVENTION

Banks compete for customers and customer accounts. For instance, banks attract potential new customers by trying to provide higher quality products and services than their competitors. Banks also offer incentives for customers of other banks to switch their accounts to the bank—i.e., to cancel their account at their current bank, and open an account at the new bank. For instance, banks offer free or reduced checking fees and higher checking or savings account interest rates as an incentive to switch. To successfully attract customers away from their current bank, the benefits of switching to the new bank should outweigh the customer's switching costs, e.g., the time and effort of canceling one account and opening a new account.

In the prior art, switching an account entails (1) canceling the old account (e.g., with bank #1) and (2) opening the new account (e.g., with bank #2). These steps are a transaction cost for both the consumers and the banks attempting to solicit them. The cost is exacerbated in the case where the consumer has bill payment information set up with bank #1 and maintains that information using personal financial management (PFM) software such as Quicken™ or Microsoft Money™. In this scenario, the consumer is much less likely to change accounts from bank #1 to bank #2 because he/she will have to re-enter all of the existing bill payment information (which can be for a number of different payees) with the new bank #2. This is why banks often consider customers with accounts having bill payment information to be "sticky," meaning that the consumers are resistant to incurring the transaction costs of changing their accounts to new banks.

Because of the high transaction costs of switching, sticky customers are far less likely to switch their accounts from their existing bank to another. Accordingly, sticky customers may stay with a current bank account's products and services even when a customer prefers a competing bank's products and services to those of a current bank. Correspondingly, banks that offer more highly desired products and services are often unable to secure relationships with these sticky customers due to the sticky customers' relationships with their prior banks.

These and other drawbacks exist with current systems and methods.

SUMMARY OF THE INVENTION

Accordingly, various embodiments of the present inventions may be directed to a system and method for setting up customer bill payment information associated with a first financial account maintained by a first financial institution in a second account maintained by a second financial institution. A request to transfer bill payment information from a first account with a first financial institution into a second account with a second financial institution is received from a customer, wherein the first account comprises first customer bill payment information, and wherein the transfer request comprises account access information usable to access the first account. The customer bill payment information is acquired by the second financial institution using a computer. The customer bill payment information is set up in the second account.

In another exemplary embodiment, a system for setting up customer bill payment information associated with a first financial account maintained by a first financial institution in a second account maintained by a second financial institution is provided. An input device receives a request to set up bill payment information associated with a first account associated with a first financial institution in a second account with a second financial institution, wherein the transfer request comprises account access information usable to access the bill payment information associated with the first account. The input device also receives the customer bill payment information. An output device for requests bill payment information from at least one of the first financial institution and a customer personal financial manager. A financial institution sets up the bill payment information in the second account.

In another exemplary embodiment, a computer-readable medium encoded with computer program code to setting up customer bill payment information associated with a first financial account maintained by a first financial institution in a second account maintained by a second financial institution is provided. The program code is effective to receive from a customer a request to transfer bill payment information from a first account with a first financial institution into a second account with a second financial institution, wherein the first account comprises first customer bill payment information, and wherein the transfer request comprises account access information usable to access the first account. The program code is effective to acquire the customer bill payment information by the second financial institution using a computer. The program code is also effective to set up the customer bill payment information in the second account.

Other embodiments are also within the scope of the invention.

DETAILED DESCRIPTION OF EXEMPLARY EMBODIMENTS

The embodiments described herein solve many problems with existing systems and methods. For instance, a preferred embodiment provides a system for automatically transferring a customer's bill payment information from an account at a first bank to an account at a second bank. The second bank may acquire the bill payment information from either a customer's personal financial manager ("PFM") or the first bank by communicating with the PFM or first bank in an open financial exchange protocol. In this way, customers may open a new account with their prior bill payment information without having to reenter such information. Accordingly, a customer may switch an account to a new bank with a minimum of startup and transaction costs to either the bank or the customer.

Overview and System Illustration

Figure 1:
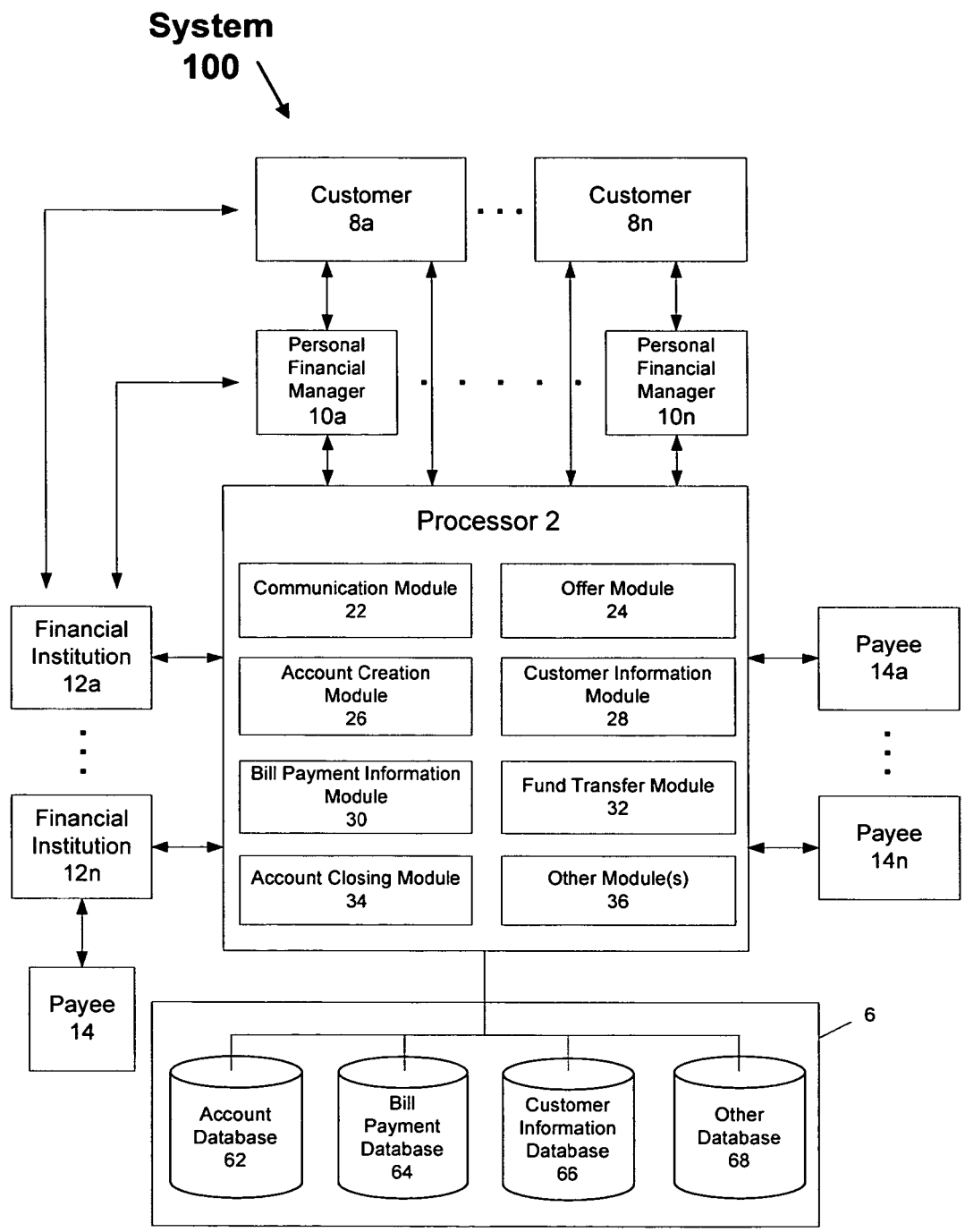
FIG. 1 depicts a system for obtaining customer bill payment information from a first financial account maintained by a first financial institution for a second account maintained by a second financial institution.

According to one exemplary embodiment as depicted in FIG. 1, a system 100 for obtaining customer bill payment information from a first financial account maintained by a first financial institution for a second account maintained by a second financial institution is provided. The system 100 comprises a processor 2, one or more customers 8a-8n, one or more payees 14a-14n, one or more personal financial managers 10a-10n, a first financial institution 12, a processor 2 comprising modules 22-36, and a database 6 comprising one or more databases 62-68. The processor may comprise various modules, including communication module 22, account creation module 26, bill payment information module 28, fund transfer module 30, account closing module 32, and other module(s) 36.

The processor 2 may communicate with one or more customers 8a-8n, one or more personal financial managers 10a-10n, and one or more first financial institutions 12. The processor 2 may be coupled to a database 6. By communicating with these entities, the processor may receive customer bill payment information from one account and input the information into another account, e.g., with a bank associated with the processor.

The database 6 may store information, such as information received from the processor 2, financial institution 12, customer 8, and credit bureau 12. The database 6 may be part of the processor 2 or it may be coupled to the processor 2. The database 6 may comprise a plurality of databases 60-68.

The customers 8 may comprise current or potential customers of financial products, such as checking account holders and offerees who have received a financial product solicitation. The customers 8 may be persons, businesses (e.g., small businesses), or other entities. For instance, a customer 8a may be an individual person (or other entity such as a corporation) who has received an offer to open an account with a bank associated with the processor 2. Another customer 8b may be an individual person who has received an offer to transfer an account balance from an existing account into a new account, e.g., a new account with a financial institution associated with processor 2. Another customer 8c may be an individual who received an offer to refinance a home as well as another offer to obtain a stored value card sponsored by a particular retailer and issued by a bank associated with the processor. The offers may specify that any bill payment information set up in a previously existing account may be transferred to a new account. Other customers 8d-8f may not receive any specific offer.

The PFMs 10 may comprise a processor, computer, server, data processing system, or other device. In a preferred embodiment, a PFM may comprise a customer's desktop computer, laptop computer, palm pilot, cell phone (e.g., a smartphone), or other device that can be used to store customer data, such as account data. In another embodiment, the PFM may comprise a computer network that stores customer data on a distributed network system. The distributed network system may comprise a plurality of nodes (e.g., computer terminals) that may access customer data stored on a central server. For instance, a PFM may comprise an interne account of the customer (e.g., an email account) that allows the customer to store information on the internet and access it from any computer connected to the internet, e.g., by providing customer identification information such as a user ID and password.

Financial institution 12 may comprise a bank or other financial institution. Preferably, a financial institution 12 comprises an entity that maintains an account of a customer 8. The account may contain bill payment information. The financial institution 12 may pay one or more payees 14a-14n, e.g., according to pre-established or currently provided bill payment information.

Payees 14 may comprise merchants, financial institutions, or other entities that may be paid or otherwise receive funds, e.g., funds from a customer account. Payees 14 may be paid by financial institutions 12, such as a bank associated with processor 2.

The database 6 may comprise a plurality of databases 62-68.

Account database 62 may store account information. Account information may comprise any information related to a financial account, such as a checking account, savings account, investment account, small business account, business account, stored value card account, credit card account, or other financial account. Account information may comprise: accountholder name, accountholder address, mother's maiden name, persons authorized to use the account, accountholder user id, accountholder password, account identification data, associated card number, routing number, balance, transaction history, bill payment information, and other account data.

Account information may comprise stock, bond, mutual fund, and other debt, equity, derivative (e.g., option, or future) or other financial investment information associated with (e.g., owned by) a person or business entity. This investment information may comprise historical information about any purchase, sale, exchange, trade, stock split, recognition event, or other event or feature associated with one or more investments. The investment information may also comprise information relating to any taxes associated with the investment, such as the basis, time of ownership, any recognition event, tax records, and any other information that may be related to the payment of tax associated with the investment (or any other tax information associated with an individual or business entity).

Bill payment database 64 may store bill payment information. Bill payment information may comprise information related to each of one or more payees 14, including: payee name, address, account number, billing date, payment date, payment due date, minimum payment due, payment history information, account balance, user id, password, automatic payment information, payee account provider information (e.g., the payee's bank routing number), and any other financial or other information related to a payee 14 or a payment to a payee 14.

Customer information database 66 may store customer 8 information. The customer information may be provided by a customer 8. The customer information may comprise personal information or any other information that relates to the customer. Customer 8 information may comprise any of the following types of information: name, address, birth date, social security number, credit score, income, job status, time at current residence, past residence information, user id, password, PIN, accounts, associated offers, associated financial or other products, and other personal or financial information. In particular, the customer information may comprise account information, e.g., any information stored in account database 62. For instance, the customer information for a particular customer may be associated with one or more particular accounts, such as any accounts provided by the bank for the customer (or accounts provided by competing banks or other financial institutions).

As used herein, the term "customer" shall refer to customers a financial institution as well as potential customers of a financial institution. The information may be provided when the customer requests to open an account with a particular bank and/or transfer an account from a prior bank into the particular bank. Customer information may be provided in cases where the customer has a pre-existing relationship (e.g., an account) with the bank as well as when there is no pre-existing account.

Other database(s) 68 may store other information relating to the customers 8, personal financial managers 10, financial institutions 12, and/or processor 2.

It should be understood that each of the plurality of databases 62-68 may store information linked to information in other databases 62-66. For instance, the offer database 60 may store information that links a specific offer with customer information in the customer information database 66.

The processor 2 may comprise a processor, server, hub, intranet, voice response unit (VRU), computer, network, banking system, and/or other processing element. Preferably, the processor 2 comprises a financial institution such as a bank, or a computer or computer system associated with a bank. For instance, the processor 2 may comprise a checking account computer system. The processor 2 may also comprise a computer system that handles the enrollment and maintenance of financial accounts such as checking and stored value card accounts. The processor 2 may comprise input and output devices for communicating with database 6, customers 8, personal financial managers 10*a*-10*n* ("PFMs"), and financial institutions 12*a*-12*n*.

The processor 2 may comprise a plurality of modules 22-36. Each module may comprise a computer or other processor, including one or more input and output devices. The processor 2 may accordingly be a system comprising a plurality of computer systems linked together on a network.

The communication module 22 may comprise one or more communication devices or systems configured to communicate with one or more persons (e.g., customers 8), one or more other devices (e.g., PFMs), and one or more other systems or networks (e.g., a bank computer system or bank internet site). The communication module may comprise an automated telephone system such as a voice response unit ("VRU"). The communication module may also comprise a server or other processor or computer that may communicate over the Internet or via other networked communication (e.g., intranet, extranet, etc.). The communication module 22 may comprise live agents who may speak with customers 8 and other entities.

The communication module 22 may perform any of the following functions: receive customer 8 phone calls; prompt customers 8 for customer information; receive customer 8 information; and pass information to the processor 2 and/or to one or more financial institutions 12. The communication module 22 may receive information (e.g., customer information such as customer bill payment information or other customer financial information) over the phone, via email, text messaging, on-line communication (e.g., via the Internet), via VOW, a direct data connection, or other means. For example, the communication module 22 may receive information from a customer 8 (or PFM 10) via a website, and the communication may provide information to a financial institution 12, PFM 10, or customer via a website.

For instance, a communication module 22 associated with one financial institution may prompt a customer 8 for information regarding a customer's account with another financial institution 12, such as account access information (e.g., a user id, password, account number, etc.). The communication module 22 may store information, such as account access information, in a database 6 such as account database 62. Other modules, such as the account closing module 34 and bill payment information module 30, may use the communication module 22 to transmit or receive bill payment information and other information (e.g., investment information).

The communication module 22 may use various protocols and communication formats for communicating with the various entities (e.g., customers 8, PFMs 10, financial institutions 12, databases 6, or other modules 24-36). For instance, the communication module may use an open financial exchange ("OFX") communication format to communicate with PFMs 10 and financial institutions 12. Because OFX is an accepted protocol for communicating financial information such as bill payment information between a bank 12 and one or more PFMs 10, a bank (such as a financial institution 12 associated with processor 2) may use an OFX protocol to obtain bill payment information (or other information) from a customer's PFM 10 or other account at another bank 12. It should be noted that this protocol is not known to be used for communication between two banks 12*a*, 12*b*.

Communication module 22 may be equipped with voice recognition devices to distill words from the speech of the customer. These modules may also use various well-known methods to obtain information from the customer. For instance, these modules may use a voice response unit to prompt for information and receive information from the customer.

The information may be received in encrypted form, and the communication module 22 may have a decryption device to decode the information. The communication module 22 may accordingly encrypt and decrypt information for security purposes. For instance, it may pass an encrypted user ID and password to a customer's PFM 10 in order to access account information stored on the PFM 10, such as bill payment information or investment information. The PFM 10 may then pass the bill payment and other information to the communication module 22 (or bill payment information module 30 or other module). If information received by a module such as the communication module 22 is encrypted, then it may be decrypted by the processor 2 (e.g., by communication module 22).

Offer module 24 may communicate one or more offers to one or more customers 8. An offer may comprise an offer to open or otherwise establish a new financial account, or to modify an existing account. An offer may comprise any other offer for a product or service, such as a financial account or other product as described herein. An offer may comprise an offer to transfer an account from one bank (e.g., first financial institution 12) to another. An offer may comprise an offer to input information into an account, such as bill payment information (or other information such as investment information) stored in another account or a PFM 10.

Offer module 24 may comprise an output apparatus for passing offers to customer 8. For instance, offer module 24 may comprise a printer to print written offers (e.g., mail solicitations), an electronic output device to send emails, text messages, or other electronic messages to customer 8, an automatic dialing device to automatically dial customer phones, and/or an output device for passing a request to a live agent 10 to provide one or more offers to one or more customers 8.

Account creation module 26 may create or modify one or more accounts. Account creation module may open an account for a customer, e.g., a customer checking account at a bank associated with the processor 2. Account creation module 26 may also modify an existing account, such as an existing savings account or debit card account of the customer. For instance, account creation module 26 may add an additional account to a customer's existing account. Account creation module 26 may accordingly receive account information from a customer, such as personal and financial information. Account creation module may also determine account information, such as account number, statement dates, minimum balance, interest rate, fees, and other account information well-known in the art.

Account creation module 26 may create or modify an account in response to a customer request to open or modify an account. For instance, account creation module 26 may open an account in response to a customer request to transfer bill payment information (or an account balance) from one bank to a bank associated with the processor 2.

Customer information module 28 may identify a customer 8 and receive, identify, access, and/or store customer 8 information. For instance, when the processor 2 receives information from a customer 8a, the customer information module 28 may process the information and store it in the customer information database 66.

Customer information may comprise any of the following information related to the customer: name, address, time at current address, email address, social security number, mother's maiden name, income (e.g., personal or household), asset information (e.g., existence of or amount in checking or savings account, or value of investments or holdings), housing payment information (e.g., monthly rental or mortgage payment), employment history, current employment status, time at current employment, credit score (or other credit data), address history, work address, home and/or work phone number, benefit information, date of birth, number of dependents, and/or other customer information. Customer information may also comprise customer preference and behavior information, such as credit card purchase activity. Customer information may also comprise all of the products and services (e.g., provided by the merchant/Bank) that are presently or have been used by the customer.

Bill payment information module 30 may request, receive, input, pass, or otherwise communicate customer bill payment information (or bill payment information requests) or other personal or financial information, such as investment information. For instance, the module 30 may pass a request to obtain bill payment information (or other financial information) associated with a specific account to a financial institution's website or other account access point, wherein the request may comprise providing account access information at the website (or other access point) to gain access to the account information, which may include bill payment information. Generally speaking, a bank or other financial institution may use bill payment information to make payments on behalf of the customer to one or more merchants, financial institutions, individuals, or other entities.

Customer bill payment information may comprise information about one or more payees 14 and/or accounts of the customer. The bill payment information may be used to facilitate (e.g., by automating) the transfer of funds from the customer's account to a payee account. A payee 14 may be a person or entity the customer pays, e.g., on a periodic or single-transaction basis. Bill payment information may comprise any of the following information for one or more payees 14 and/or accounts: payee name, payee address, payee account number, payee memoranda, prior payment information (e.g., amount and date for one or more prior payments), and payee bank. For instance, bill payment information may comprise a payment schedule indicating that Merchant #1 must be paid $50 on the first of every month. Bill payment information may comprise instructions to pay a monthly credit card bill associated with the account, or to pay a utility bill based on utility bill information that is passed to the customer's bank every month (e.g., by a utility company).

Bill payment information may also enable a customer 8 to make a payment from the account without entering all the necessary payee 14 or payment information. The customer 8 may use stored payment information instead of re-entering it for each transaction. The payee 14 may simply select a payee 14 from a list of payees 14 stored in the account and specify an amount of funds to transfer, and then the bank may automatically transfer said funds to the payee 14. In this way, the customer may use the stored payee information to instruct the bank to transfer a specified amount of funds from the customer's account to a payee account at a specified time.

Bill payment information module 30 may also modify an account (such as an existing account), e.g., by setting up bill payment information in one or more new or pre-existing customer accounts, e.g., at a bank associated with the processor 2. For instance, bill payment information module 30 may modify an existing account with a bank by importing bill payment information or other account information into the account, e.g., from a customer's PFM 10 or other computer or from another account of the customer or an entity associated with the customer. For instance, bill payment information module 30 may transfer bill payment information or investment information from a first account at a first bank 12 to a second account at a second bank (e.g., a bank associated with processor 2).

Bill payment information module 30 may store bill payment information and other personal or financial information in a database 6, such as bill payment database 64.

Bill payment information module 30 may pass customer bill payment information (or other information) to or from a customer 8, a PFM 10, or a financial institution 12 (e.g., a financial institution that stores a customer's bill payment information). For instance, the module 30 may "synch" with a PFM 10 or financial institution 12 in a manner similar to how a PFM and a financial institution may synch with one another in a traditional synching process. In a traditional synching process, a PFM 10 and financial institution 12 may communicate and upload (or download) any new financial information posted to either the PFM 10 or financial institution 12, such as bill payment information and account activity. Synching can occur automatically or at the request of either the financial institution 12 or customer 8 (e.g., via the PFM 10).

In some embodiments, bill payment information module 30 may request a customer's investment information (e.g., stock ownership information) from one account database and pass it to another database (e.g., a database associated with the same or another account). The bill payment information module 30 may cause the investment information to be passed to or from a PFM 10 or other database. For example, the module 30 may download investment information associated with one or more accounts from an account website into a customer's 8 PFM 10.

Traditionally, the automated transfer of bill payment or other financial information occurs only if this feature is pre-configured for the PFM 10 and financial institution 12. Here, synching may occur even though the module 30 is not pre-configured to communicate with the PFM 10 or financial institution 12, or otherwise pre-associated with such entities 10, 12 to enable synching. Rather, such "synching" between the module 30 and other entities 10, 12 may be enabled based on information provided by the module 30 to the PFM 10 or financial institution 12, such as account access information. The module 30 may provide account access information to the entities 10, 12 in a manner similar to a traditional synching process. For instance, the customer 8 may first provide the processor 2 account access information so that the bill payment information module 30 may access account information (e.g., bill payment information) from the PFM 10 or the financial institution 12 maintaining the account.

The module 30 may use an OFX format to communicate with such entities 10, 12 in order to obtain the information. Some OFX communications may be passed online, e.g., to a website associated with a financial institution 12.

Fund transfer module 32 may transfer funds from one account, such as a customer's account at a bank associated with the processor 2, to an account at another financial institution 12. Fund transfer module 32 may determine any of the following information with respect to a transfer (e.g., a transaction): payee 14, transaction time, transaction recurrence data, destination account, destination routing number, transaction memo, transaction summary information, and any other information related to a transaction. The fund transfer module 32 may transfer funds at the instructions of the customer 8, PFM 10, financial institution 12, bill payment information module 30, or other entity. For instance, the fund transfer module 32 may cause $50 to be transferred from a customer's account to a telecommunications service provider on the first of every month at noon, pursuant to customer bill payment information received from another financial institution 12.

Fund transfer module 32 may also pay a payee a specific amount at a specific time from a specific account, e.g., at the request of the processor 2 or customer 8. For instance, fund transfer module 32 may cause the second financial institution (e.g., a bank that maintains a second account associated with the processor 2) to pay a payee 14 according to bill payment information received from a customer PFM 10 or from a financial institution 12 that maintained a prior customer account.

Account closing module 34 may close or modify an account, or otherwise communicate information effective to close or modify an account. For instance, account closing module 34 may instruct a financial institution 12 to close a customer's 8 account, e.g., by passing account access information to the financial institution 12, accessing the account, and then requesting the financial institution to close the account. During this process, the fund transfer module 32 may request the financial institution 12 to pass any remaining funds to an account (e.g., an account stored in account database 62 and maintained by the processor 2, or an account at a bank associated with the processor). The process may also involve requesting to obtain (and obtaining) bill payment information from the financial institution 12.

Other module(s) 36 may perform other functions.

It should be appreciated that the modules 22-36 may access and store information in the databases 62-68. It should also be understood that the server 2 and modules described herein may perform their described functions automatically or via an automated system. As used herein, the term "automatically" refers to an action being performed by any machine-executable process, e.g., a process that does not require human intervention or input.

Illustrative Process

Figure 2:
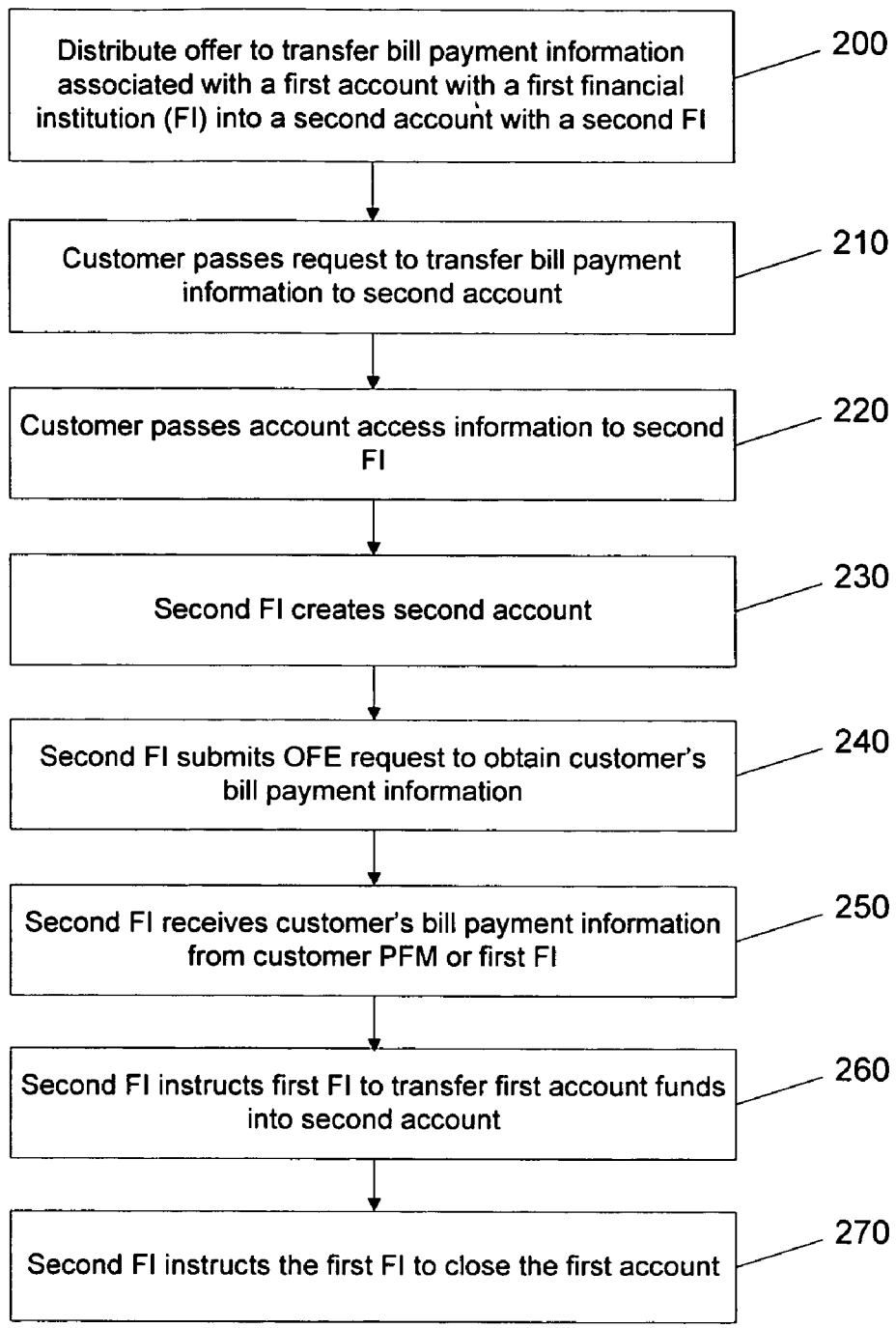
FIG. 2 depicts a method for obtaining customer bill payment information from a first financial account maintained by a first financial institution for a second account maintained by a second financial institution.

FIG. 2 depicts a method for obtaining customer bill payment information from a first financial account maintained by a first financial institution for a second account maintained by a second financial institution.

In block 200, an offer to transfer bill payment information associated with a first account with a first financial institution into a second (new or pre-existing) account with a second financial institution is distributed. The offer may comprise an offer to open an account, an offer to close an account, an offer to pass bill payment information to an account (e.g., a new account), or an offer to otherwise modify or create an account.

For instance, a bank may offer to transfer a customer's current account, such as a checking account with a financial institution, into an account with a bank (e.g., a bank associated with processor 2). The customer's current account with the financial institution may have bill payment information associated with it (e.g., stored in the account). Accordingly, the customer's current account may track customer purchases, store records, automatically pay or process customer bills, and perform other functions. The bank may offer to provide a new account to the customer that accomplishes some or all of these goals.

Alternately, a bank may simply offer to provide an account to a customer. In response, the customer may request to transfer a current account (e.g., including bill payment information stored in the current account) into the new account.

In block 210, a customer may pass a request to transfer bill payment information into a second account, e.g., an account with the second financial institution. The request may be passed to the second financial institution. The second account may be a new or previously existing account. The request may further comprise a request to open the second account. For instance, the customer may request for the second financial institution to open a second financial account and also set up customer bill payment information in the account, e.g., by transferring it from a source such as a prior account or a database of the customer (e.g., a PDA or computer database, such as a PDA or computer equipped with personal financial management (PFM) software such as Quicken™ or Microsoft Money™).

The request may be received over the Internet, e.g., at a web page of the second financial institution. The request may also be received by an agent (e.g., a customer service representative) of the second financial institution, e.g., at a retail branch of the second financial institution.

In block 220, a customer may pass account access information to the second financial institution. The information may be passed from the customer or from a customer's PFM or other financial information storage device or communication device, or from another source of such account access data. The information may be received over the Internet, e.g., at a website of a bank associated with a processor.

The account access information may comprise user id, password, name, address, account number, PIN, financial institution identification information, and/or other information associated with the customer or the account (with the first financial institution) to the second financial institution. This may be in response to a request from the second financial institution.

For instance, the customer may provide information to the second financial institution so that the second financial institution can access information (e.g., bill payment information) from a customer's PFM or the first financial institution (which maintains the account).

For instance, the second financial institution may receive an affirmative response to the offer of block 200, such as: an acceptance; a request to open an account with the second financial institution; a request to transfer an account with the first financial institution into a new or pre-existing account with the second financial institution; or another indication of an interest to pass the customer's bill payment information to the bank or bank processor.

In block 230, the second financial institution may create a second account, e.g., an account for the customer. (It should be appreciated that this action is necessary only if a customer account does not already exist with the second financial institution). If an account already exists with the second financial institution, the action in this block may comprise amending the account, e.g., by changing account information, or changing the properties, features, rights, accessibility, privileges, rewards, or other information associated with the account.

In block 240, the second financial institution may submit a request to obtain the customer's bill payment information. The request may be in an open financial exchange (OFX) format or protocol, and it may be submitted online (e.g., at a website of a financial institution that maintains an account (e.g., the first account) that stores the bill payment information).

The request may be submitted to the first financial institution. The second financial information may use some or all of the account access information (such as user ID and password), e.g., by passing such information to the first financial institution. In making the request, the second financial institution may effectively behave in a manner similar to a PFM, such as the customer's PFM. In other words, the second financial institution may behave as if it were authorized to download (or upload) customer bill payment information as if it were a bank communicating with a pre-authorized PFM, or a PFM communicating with a pre-authorized bank. The second financial institution may effectively "synch" its second account data with the first financial institution's first account data, e.g., via an exchange of data using OFX protocols. By synching the records stored at the first and second financial institutions, the first financial institution may pass the customer's bill payment information to the second financial institution.

The request may alternately (or in addition) be submitted to the customer, or to the customer's PFM or other processor or database that contains (or has access to) the customer's bill payment information, e.g., via Quicken™ or Microsoft Money™ applications. The second financial institution may effectively "synch" with the customer's PFM, e.g., using the PFM software applications and an OFX protocol. By synching with the second financial institution, the PFM may pass information (e.g., customer bill payment information) stored in the PFM (or otherwise accessible to the PFM) to the second financial institution.

This may occur in the same manner by which the customer might upload new bill payment information to the first financial institution using the PFM. The difference here is that the information may be passed to a financial institution that is not the accountholder.

In scenarios where the customer bill payment information is requested from the customer (or customer PFM), the second financial institution may behave like a PFM device configured to communicate information, e.g., updated financial information, with another entity such as a PFM or bank processor. For instance, the second financial institution (e.g., via communication module 22 or bill payment information module 30) may act like another customer PFM device. For instance, the customer may have a desktop computer, laptop computer, palm pilot, or computer network equipped with PFM applications.

In block 250, the second financial institution may receive customer bill payment information, e.g., from a customer PFM or from the first financial institution. This may be in response to the request of block 240. The information may be stored in a database 6 (e.g., bill payment database 64). The information may be uploaded to an account (e.g., the second account) to enable manual and automated bill payment transactions and record-keeping by the second financial institution for the second account.

In block 260, the second financial institution may instruct the first financial institution to transfer first account funds into the second account. This transfer may be associated with closing the account in block 270.

For instance, the second financial institution may provide account access information to the second account to establish access to account information and control over the account, and then the second financial institution may request to close the account. Using account access information, the second financial institution may effectively serve as a proxy for the customer, and may accordingly direct account business and transactions under the authority of the customer.

The action of block 260 is optional.

In block 270, the second financial institution may instruct the first financial institution to close the first account. As in block 260, this action may involve establishing control over the account. Once control over the account is established (e.g., by providing a user ID and password for the account as the accountholder may do when regularly transacting account business), the second financial institution may control various affairs of the account, possibly including transferring funds and closing the account, as well as any other financial action related to the account (such as changing account preferences, uploading bill payment information, and establishing related subordinate accounts).

With control over the first account, the second financial institution may alternately use the account to make payments and otherwise transact business according to the instructions of the customer. For instance, the second financial institution may instruct the first financial institution to pay a specific amount to a specific payee. In this way, the customer may communicate with only one account (the second account) while maintaining several different accounts, while the single account directly controls the other accounts. A customer may accordingly enjoy special benefits of multiple banks, such as a travel rewards program from one bank and a rebate plan with another.

The action of block 270 is optional.

In effect, by the actions described in FIG. 2, a customer's financial account may be switched from one bank to another. This may occur with a minimum of inputs by the customer. For instance, it may require merely a user ID and password. Minimizing inputs reduces transaction costs for both the bank and the customer in changing accounts and/or enabling bill payment information on an account that did not previously have bill payment information.

The actions of all or merely some of the blocks may be accomplished within the scope of this invention. The actions may be completed in any order, and they may overlap in time with other actions.

The embodiments of the present inventions are not to be limited in scope by the specific embodiments described herein. For example, although many of the embodiments disclosed herein have been described with reference to Banks and telephone telemarketing, the principles herein are equally applicable to other merchants and other methods of processing offers, e.g., processing offers on the Internet. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer-implemented method for setting up customer bill payment information associated with a first account maintained by a first financial institution in a second account maintained by a second financial institution, comprising:

receiving from a customer, via a computer processor over a computer based network, a request to transfer bill payment information from the first account with the first financial institution into the second account with the second financial institution, the second account comprising a new or a pre-existing account at the second financial institution and the first account comprising customer bill payment information, and the transfer request comprising account access information usable by the second financial institution to access the first account at the first financial institution, and the transfer request is received by the second financial institution;

wherein further the customer bill payment information comprises information about one or more payees and one or more of an address, account number, payment schedule, bill payment history information, and prior payment record;

acquiring, by synching the first account with the second account with no interaction from the customer, via the computer processor over the computer based network, the customer bill payment information from the first financial institution by the second financial institution using the account access information provided by the customer;

configuring, by the computer processor, the customer bill payment information in the second account;

directing, by the second financial institution, at the request of the customer, transactions associated with the bill payment information wherein the transactions are associated with at least one of the first account or the second account; and accessing, by the second financial institution, the first account using a website of the first financial institution, by providing the account access information.

2. The method of claim 1, wherein the act of acquiring the customer bill payment information comprises passing an open financial exchange (OFX) request for customer bill payment information.

3. The method of claim 2, wherein the passing action comprises passing the OFX request on-line to a website of the first financial institution.

4. The method of claim 1, wherein the act of acquiring the first customer bill payment information comprises passing a request for the customer bill payment information from the second financial institution to the first financial institution, wherein the request is in an open financial exchange (OFX) format.

5. The method of claim 1, wherein the customer bill payment information is acquired from a personal financial manager (PFM) of the customer.

6. The method of claim 5, wherein the customer bill payment information is acquired by synching with the PFM of the customer.

7. The method of claim 1, further comprising:
receiving updated bill payment information from the customer; and
passing the updated bill payment information to the first financial institution by the second financial institution.

8. The method of claim 1, wherein the first account contains customer funds, further comprising:
passing a request to transfer the customer funds from the first financial institution to the second financial institution.

9. The method of claim 1, further comprising
receiving from the customer a request to close the first account.

10. The method of claim 9, further comprising:
instructing the first financial institution to close the first account.

11. The method of claim 1, further comprising:
receiving an account transfer request comprising a request to transfer the first account into the second account.

12. The method of claim 1, wherein the request to transfer bill payment information is received at a website of the second financial institution.

13. The method of claim 1, wherein the request to transfer bill payment information is received by a customer service representative at a retail branch of the second financial institution.

14. The method of claim 1, wherein the first account is at least one selected from the group consisting of a savings account, a credit card account, an investment account, and a stored value card account.

15. The method of claim 1, wherein the first account comprises one or more checking accounts associated with the customer.

16. The method of claim 1, wherein the first account comprises a small business account.

17. The method of claim 11, further comprising:
paying at least one of the one or more payees based on the customer bill payment information.

18. The method of claim 1, wherein the account access information comprises a user id.

19. The method of claim 1, wherein the account access information comprises a password.

20. The method of claim 1, further comprising:
controlling the first account by the second financial institution at the request of the customer for one or more transactions after the act of configuring the customer bill payment information in the second account.

21. The method of claim 1, further comprising:
conveying an offer to the customer to transfer bill payment information from the first account with the first financial institution into the second account with the second financial institution.

22. The method of claim 1 wherein the account access information comprises a password, personal identification number (PIN) or other private or confidential information of the customer.

23. The method of claim 1 wherein the second financial institution accesses the first account and acquires the customer bill payment information via an agent.

24. A system for setting up customer bill payment information associated with a first account maintained by a first financial institution in a second account maintained by a second financial institution, comprising:

at least one computer processor, associated with the second financial institution coupled to a computer network, the at least one computer processor being configured to:

receive a request to set up bill payment information associated with the first account with the first financial institution in a second account comprising a new or a pre-existing account with the second financial institution, wherein the transfer request comprises account access information usable by the second financial institution to access the bill payment information associated with the first account, and the request is received by the second financial institution;

wherein further the bill payment information comprises information about one or more payees and one or more of an address, account number, payment schedule, bill payment history information, and prior payment record;

acquire the customer bill payment information from the first financial institution, wherein the customer bill payment information is acquired by synching the first account with the second account by the second financial institution with no interaction from the customer; and direct transactions, at the request of the customer, associated with the bill payment information wherein the transactions are associated with at least one of the first account or the second account;

access the first account using a website of the first financial institution by providing the account access information; and configure the customer bill payment information in the second account.

* * * * *